Feb. 20, 1951 — D. A. BROWN — 2,542,390
RECIPROCATING PISTON TYPE VALVE
Filed June 23, 1947 — 3 Sheets-Sheet 1
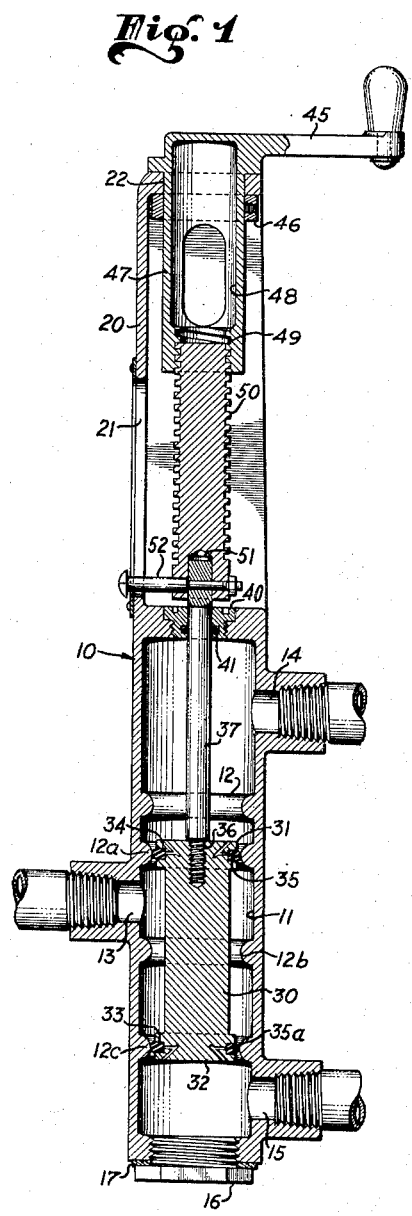
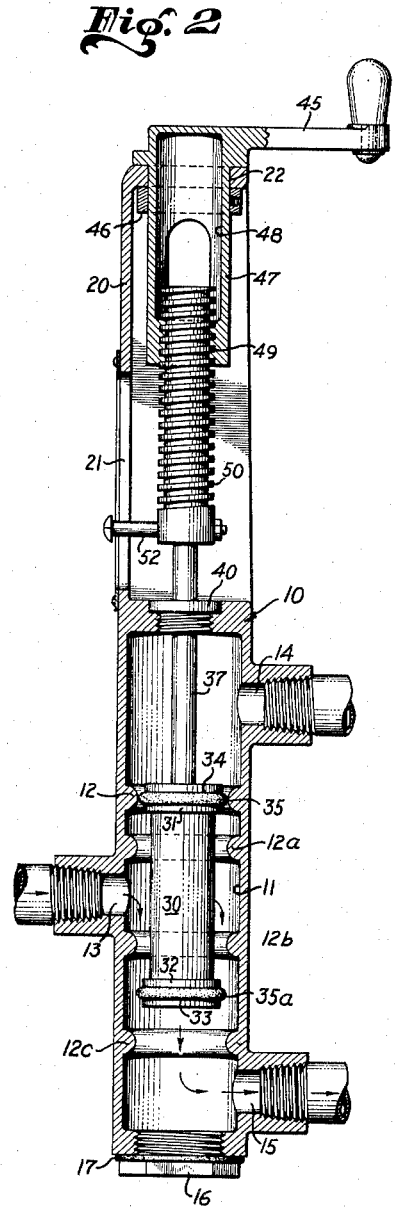
INVENTOR:
DAN A. BROWN.
BY Huebner, Malsby and Buehler
ATTORNEYS.

Feb. 20, 1951 D. A. BROWN 2,542,390
RECIPROCATING PISTON TYPE VALVE
Filed June 23, 1947
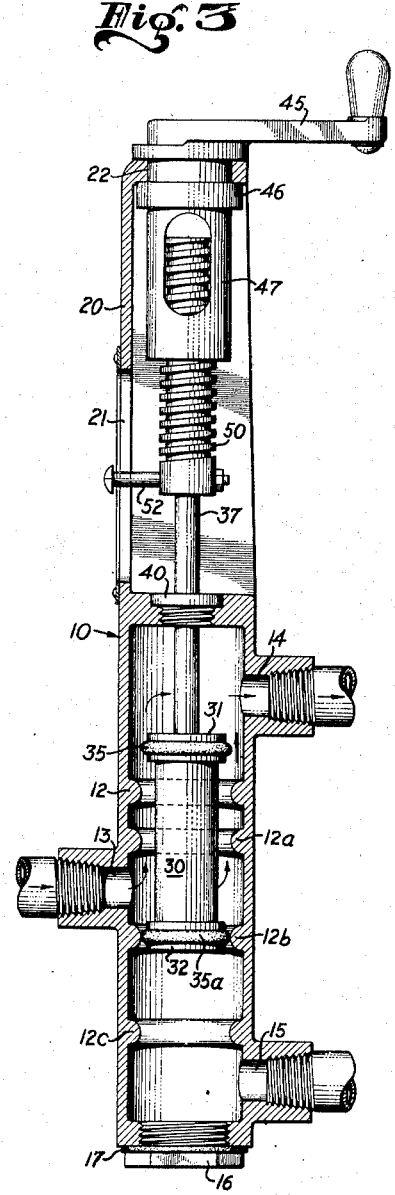
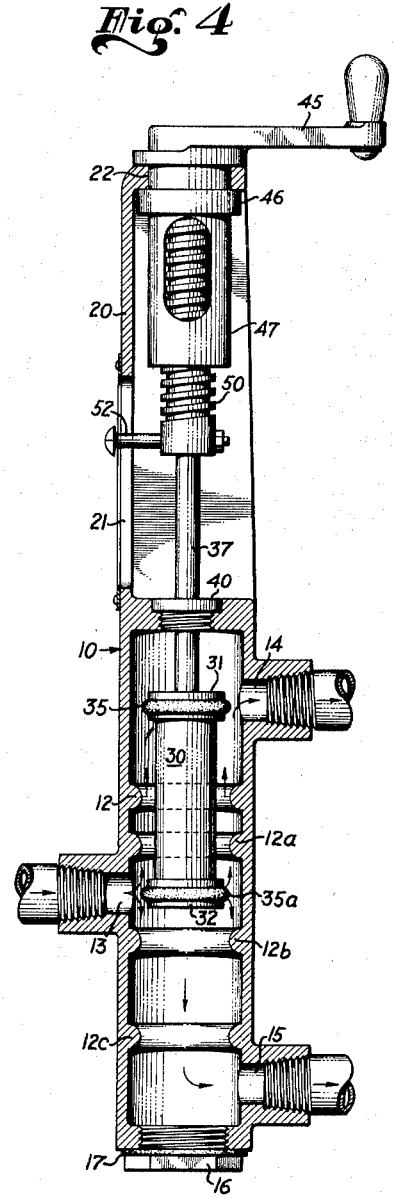
INVENTOR:
DAN A. BROWN.
BY Huebner, Maltby
and Buehler
ATTORNEYS.

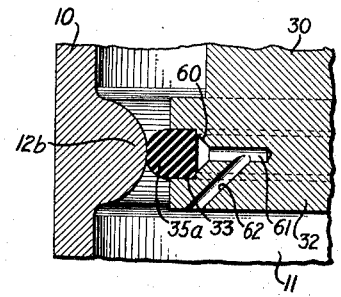
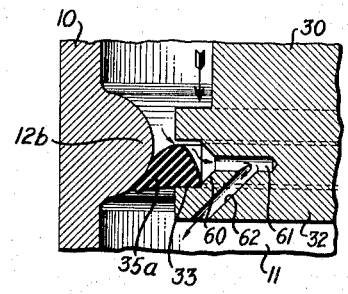
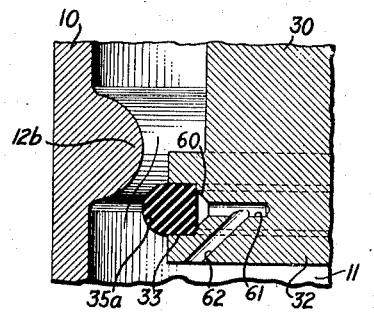

Patented Feb. 20, 1951

2,542,390

UNITED STATES PATENT OFFICE 2,542,390

RECIPROCATING PISTON-TYPE VALVE

Dan A. Brown, Long Beach, Calif., assignor to Rheem Manufacturing Company, Richmond, Calif., a corporation of California Application June 23, 1947, Serial No. 756,505

13 Claims. (Cl. 251—75)

1

This invention relates to a reciprocating piston type valve and has more particular reference to a multiple valve unit wherein the valve members are carried on a single reciprocating stem adapted upon reciprocal movement to direct the flow of fluids into one or more of a plurality of discharges.

The primary object of my invention is to produce a valve of the type having a plurality of inlets and discharges, a plurality of valve seats in axial alignment, and a plurality of valves carried by a single reciprocating stem and adapted to engage the various valve seats upon reciprocation of the stem, thereby directing the fluid into the various inlets and discharges, which is provided with means for relieving pressure during a lateral displacement of the cylinder to prevent dislodging the valve ring from its seat.

Valves of this general nature are well known in the art. They have been subject to one serious deficiency, which, under certain circumstances, has rendered them inoperative. It has been found that while the plunger is being moved in a direction away from the pressure that there has been a tendency for the valve face, which is usually an O ring of resilient material, to rupture or become dislodged from its seat. It is a purpose of my invention to provide a reciprocating disc-type multi-way valve which prevents rupture or dislocation of the valve face from its seat.

It will be understood that the essential features of my invention are applicable to a wide variety of valve designs and are not to be confined to the specific flow arrangements hereinafter described in more detail. Further objects and advantages will become apparent from the drawings and specifications relative thereto.

In the drawings:

Figure 1 illustrates a multi-way valve embodying the principles of my invention and shown in its lowermost position.

Figure 2 is a similar view showing the valve plunger in its second position.

Figure 3 is a similar view showing the valve in its third position.

Figure 4 is a similar view showing the valve in its fourth position.

Figure 5 is an enlarged fragmentary detail showing the valve ring in sealing position.

Figure 6 is a similar view showing the valve immediately past sealing position.

Figure 7 is a similar view showing the valve in open position.

Referring more specifically to Figure 1, I have illustrated a multi-way valve comprising a valve body, designated generally 10, formed with an axial bore 11 and having a plurality of inwardly extending axially aligned annular bosses or valve seats 12a, 12b, and 12c. The valve body 10 is also provided with an inlet 13 and discharges 14 and 15. The bore 11 is closed at its lower end by means of a threaded cap 16 and gasket 17. The housing 10 is also provided with an upwardly extending bracket member 20 having a longitudinal slot 21 and being formed with a bore 22 in axial alignment with the bore 11. The specific details of the valve herein illustrated and described are for purposes of orientation only. It will readily be understood that the invention does not reside in the specific valve but rather in the improved means for rendering this general type of valve more efficient and operative under all conditions.

A valve stem 30 is disposed in the bore 11 and is formed with enlarged ends or discs 31 and 32. Annular grooves 34 and 35, respectively, are cut in the valve discs 31 and 32 and are adapted to receive valve faces 35 and 35a, respectively, in the form of a D ring.

The valve face 35 may be made of any suitable resilient material, such as rubber, neoprene or other so-called synthetic rubbers, the purpose being to form an effective fluid seal between the peak of the valve seat 12 and the D ring or valve face 35.

The valve stem 30 is formed with a longitudinal threaded bore 36 which is adapted to receive a control rod 37. The control rod 37 is disposed through the housing 10 in water-tight engagement by means of a packing nut 40 and O ring 41. The O ring 41 has sufficient tension about the reciprocating valve rod 37 to effectively seal the opening against the escape of fluid under pressure. A control handle 45 is rotatably disposed at the top of the bracket member 20 and is held in position by means of a washer 46. The axial portion 47 of the handle 45 is cylindrical in shape and defines a bore 48. The lower end 49 is threaded internally. A threaded shaft 50 is engaged by the threaded end 49 so that upon rotation of the handle 45, the shaft 50 will be drawn upwardly into the bore 48.

The reciprocating control rod 37 is securely fastened into a bore 51 of the threaded shaft 50 by means of a shoulder bolt 52 which extends outwardly through the slot 21, thereby preventing rotation of the reciprocating valve assembly upon rotation of the handle 45.

In Figures 5, 6 and 7 I more clearly illustrate the details of construction of the valve face and valve disc. The D ring 35a is disposed in a circumferential groove 33 and has a slightly smaller inside diameter than the groove 33, thereby forming a water-tight seal. The outside diameter of the D ring 35a is larger than the inside diameter of the valve seat 12b thereby engaging the valve seat 12b in fluid-tight engagement. A V-shaped groove 60 is cut in the bottom of the peripheral groove 34. At spaced intervals holes 61 are radially drilled into the bottom of the groove 60. Diagonal bores 62 are drilled inwardly from the shoulder of the enlarged portion 32 to communicate with the radial bores 61. The diagonal bores 62 should be drilled from the low pressure side. The reason for this will become apparent upon further discussion of the function.

In order to illustrate the operation of my invention, I have shown a valve employing the principles of my invention in four different positions. Figure 1 illustrates the valve in its "off" position. I will be noted that the rings 35 and 35a are engaging valve seats 12a and 12c in such a way that there is no communication between the inlet 13 and either of the discharges 14 or 15.

Figure 2 illustrates the valve in position whereby D ring 12 is engaging valve seat 35. However, the ring 35a is not engaging any of the valve seats, thereby leaving a free communication between inlet 13 and discharge 15.

Upon further rotation of the handle 45, the threaded shaft 50 is drawn farther into the bore 48, thereby raising the stem 30 into its next position where the valve ring 35a is in contact with valve seat 12b below the inlet 13, but the valve ring 35 is not in registry with any of the valve seats so that there is a clear passage from the inlet 13 to the discharge 14.

Figure 4 shows the valve in its top position where the rings 35 and 35a are not contacting any of the valve seats, thereby creating a free communication from the inlet 13 to both discharges 14 and 15.

The principal advantage of my invention is illustrated more clearly in Figures 5, 6 and 7. In Figure 5 the D ring 35a is shown in contact with the seat 12b. It will be understood that during the operation of the valve its high pressure side is on top and the stem 30 is moving downwardly.

As illustrated in Figure 6, as the stem 30 moves downwardly so that the D ring 35a approaches the receding wall of the valve seat 12b, the pressure of the fluid from above tends to expand the D ring so that it follows the contour of the valve seat 12b.

It has been found that, in valves of standard construction, such as were heretofore known, the force of the fluid expanded the D ring sufficiently far to force it out of its seat, or in the event of a reversal of direction of the plunger 30, resulted in shearing off of the D ring.

This difficulty has been eliminated in my invention by providing the relief ports comprising the annular groove 60 and the communicating bores 61 and 62. As shown in Figure 6, it will be seen that when the base of the ring 35a is forced away from the annular groove 60 a communication is established between the high and the low pressure sides by means of the bores 61 and 62. As soon as this pressure is relieved the D ring snaps back into the position shown in Figure 7, thereby creating a communication from the high pressure side to the low pressure side between the D ring 35a and the valve seat 12b.

Whereas, it was felt necessary to explain my invention in connection with a complete valve assembly, which has been described and is illustrated in Figures 1 to 4 inclusive, it will be understood that my invention is applicable to any desired porting arrangement whereby a reciprocating plunger having a resilient valve face is used to control the flow of fluid. What I consider to be the essential features of my invention is a reciprocating disc-type valve having a resilient face on said reciprocating disc and which is provided with a relief port from the high to the low pressure side.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. In a valve of the reciprocating piston type, a housing formed with a longitudinal bore and a plurality of valve seats disposed in spaced relation in said bore, a piston reciprocally disposed in said bore and formed with valve members adapted to engage successively said valve seats in sealing engagement, each of said valve members comprising a disc-like member formed with a peripheral groove, a D ring disposed in said groove, a relief port communicating between the base of said peripheral groove and the low pressure side of said valve member.

2. In a valve of the reciprocating piston type, a housing formed with a longitudinal bore and a plurality of valve seats disposed in spaced relation in said bore, a piston reciprocally disposed in said bore and formed with a plurality of valve members adapted to engage successively said valve seats in sealing engagement, each of said valve members comprising a disc-like member formed with a peripheral groove, a D ring disposed in said groove, and a plurality of relief ports communicating between the base of said peripheral groove and the low pressure side of said valve member.

3. In a valve of the reciprocating piston type, a housing formed with a longitudinal bore, a plurality of valve seats disposed in spaced relation in said bore, one or more inlets communicating with said bore and one or more outlets communicating with said bore, a piston reciprocally disposed in said bore and formed with a plurality of valve members adapted to engage successively said valve seats in sealing engagement, each of said valve members comprising a disc-like member formed with a peripheral groove, a D ring disposed in said groove, a plurality of relief ports communicating between the base of said peripheral groove and the low pressure side of said valve member.

4. A fluid control valve comprising a housing having one or more inlets and one or more outlets and formed with a longitudinal bore communicating with said inlets and outlets, a plurality of lands disposed in spaced relation in said bore, a valve stem reciprocally disposed in said bore, and a plurality of valves carried by said valve stem and adapted to cooperate with said lands to control the flow of fluid through said control valve, each of said valves comprising a disc-shaped member formed with a peripheral groove, a resilient D ring seated in said groove and a plurality of relief ports communicating between the seat of said D ring and the low pressure side of said disc shaped member.

5. A fluid control valve comprising a housing having one or more inlets and one or more outlets and formed with a longitudinal bore communicating with said inlets and outlets, a plurality of lands disposed in spaced relation in said bore, a valve stem reciprocally disposed in said bore, and a plurality of valves carried by said valve stem and adapted to cooperate with said lands to control the flow of fluid through said control valve, each of said valves comprising a disc-shaped member formed with a peripheral groove, a resilient D ring disposed in said groove and a relief port communicating between the seat of said D ring and the low pressure side of said disc shaped member.

6. A fluid control valve comprising a housing having one or more inlets and one or more outlets and formed with a longitudinal bore communicating with said inlets and outlets, a plurality of lands disposed in spaced relation in said bore, a valve stem reciprocally disposed in said bore, and a plurality of valves carried by said valve stem and adapted to cooperate with said lands to control the flow of fluid through said control valve, each of said valves comprising a disc-shaped member formed with a peripheral groove, a resilient D ring disposed in said groove and seated in the bottom thereof in fluid-tight engagement, and a relief port communicating between the seat of said D ring and the low pressure side of said disc shaped member.

7. A fluid control valve comprising a housing having one or more inlets and one or more outlets and formed with a longitudinal bore communicating with said inlets and outlets, a plurality of lands disposed in spaced relation in said bore, a valve stem reciprocally disposed in said bore, and a plurality of valves carried by said valve stem and adapted to cooperate with said lands to control the flow of fluid through said control valve, each of said valves comprising a disc-shaped member formed with a peripheral groove, a resilient D ring disposed in said groove and seated in the bottom thereof in fluid-tight engagement, and a plurality of relief ports communicating between the seat of said D ring and the low pressure side of said disc shaped member.

8. A reciprocating piston-type valve having a high and a low pressure side, said valve comprising a disc-like member being formed with a peripheral groove having a flat bottom, and a resilient D-ring disposed in said groove, said disc-like member being formed with a relief port communicating between said peripheral groove and the low pressure side of said valve.

9. A reciprocating piston-type valve having a high and a low pressure side, said valve comprising a disc-like member being formed with a peripheral groove, and a resilient D-ring disposed in said groove, said disc-like member being formed with a relief port communicating between said peripheral groove and the low pressure side of said valve.

10. A valve adapted to be reciprocally disposed in a cylindrical bore through which fluid is forced under pressure, said bore being formed with an annular valve seat projecting inwardly from the walls of said bore, said valve and said valve seat being adapted to cooperatively interrupt the flow of said fluid under pressure, said valve comprising a disc-like member formed with a peripheral groove, and a resilient D-ring disposed in said groove, said D-ring being in fluid-tight relation, said disc-like member being also formed with a relief port communicating between said groove and the low pressure side of said valve.

11. A valve adapted to be reciprocally disposed in a cylindrical bore through which fluid is forced under pressure, said bore being formed with an annular valve seat projecting inwardly from the walls of said bore, said valve and said valve seat being adapted to cooperatively interrupt the flow of said fluid under pressure, said valve comprising a disc-like member formed with a peripheral groove having a flat bottom, and a resilient D-ring disposed in said groove, said D-ring having a flat bottom adapted to seal the bottom of said groove in fluid-tight relation, said disc-like member being also formed with a plurality of relief ports communicating between the bottom of said groove and the low pressure side of said valve.

12. A fluid control valve comprising a housing formed with a cylindrical bore and a plurality of passages communicating between said bore and the outside of said valve body, one or more annular valve seats disposed in said bore and a reciprocating valve disposed in said bore adapted to partition said cylindrical bore into high and low pressure areas when seated against one of said annular valve seats, said valve comprising a disc-like member formed with a peripheral groove having a flat bottom, and a D-ring disposed in said groove in fluid-tight relation, said disc-like member being formed with apertures communicating between the bottom of said groove and the low pressure side of said valve.

13. A fluid control valve comprising a housing formed with a cylindrical bore and a plurality of passages communicating between said bore and the outside of said valve body, one or more annular valve seats disposed in said bore, and a reciprocating valve disposed in said bore adapted to partition said cylindrical bore into high and low pressure areas when seated against one of said annular valve seats, said valve comprising a disc-like member formed with a peripheral groove, and a D-ring disposed in said groove in fluid-tight relation, said disc-like member being formed with an aperture communicating between said groove and the low pressure side of said valve.

DAN A. BROWN.

REFERENCES CITED

The following references are of record in the file of this patent:

UNITED STATES PATENTS

| Number | Name | Date |
| --- | --- | --- |
| 331,789 | Harvey | Dec. 8, 1885 |
| 744,643 | Swan | Nov. 17, 1903 |
| 1,087,890 | Rogers | Feb. 17, 1914 |
| 1,517,593 | Slate | Dec. 2, 1924 |
| 1,721,114 | Hampton | July 16, 1929 |
| 2,011,674 | Canady | Aug. 20, 1935 |